United States Patent [19]

Vargo

[11] Patent Number: 5,411,154
[45] Date of Patent: May 2, 1995

[54] SYSTEM FOR JOINING SUPPORT MEMBERS

[75] Inventor: William R. Vargo, Lithonia, Ga.
[73] Assignee: Hardy Manufacturing, Inc., Lithonia, Ga.
[21] Appl. No.: 119,486
[22] Filed: Sep. 13, 1993
[51] Int. Cl.⁶ .................................................. A47F 5/00
[52] U.S. Cl. ..................................... 211/189; 211/191
[58] Field of Search .................. 211/189, 191, 182; 411/399, 411, 424

[56] References Cited

U.S. PATENT DOCUMENTS

| | | | |
|---|---|---|---|
| 4,545,490 | 10/1985 | Hsiao et al. | 211/182 X |
| 4,854,114 | 8/1989 | Speck | 411/399 X |
| 4,896,992 | 1/1990 | Muhlethaler | 211/182 X |
| 4,967,916 | 11/1990 | Handler et al. | 211/182 X |
| 5,020,678 | 6/1991 | Klein | 211/182 X |
| 5,263,598 | 11/1993 | Vortherms | 211/189 X |

Primary Examiner—Ramon O. Ramirez
Assistant Examiner—Sarah L. Purol
Attorney, Agent, or Firm—Vickers, Daniels & Young

[57] ABSTRACT

A readily assembled and disassembled static structure such as a scaffolding or a rack for shelving, bracing or the like is composed of a plurality of elongated metallic support members fastened together in a predetermined precise arrangement. Each support member contains at least one row in a longitudinal direction of identically sized holes in the shape of a polyhedron having four sides or a multiple thereof. The support members are fastened together using a bolt which has an unthreaded portion adjacent the head of the bolt adapted to engage the shaped holes, and a nut threaded onto said bolt. The end of the bolt includes an extension beyond the threads which can be struck with a hammer during disassembly of the support without causing damage to the threads. Channels and angle bracing preferably are used as the support members of the invention although other elongated members can likewise be assembled in the same manner according to the teachings herein. The support members can be joined at 45° or 90° angles by the use of star-shaped holes having 8-points and a fastener including a bolt which has a neck having a matching star-shaped cross-section.

29 Claims, 6 Drawing Sheets

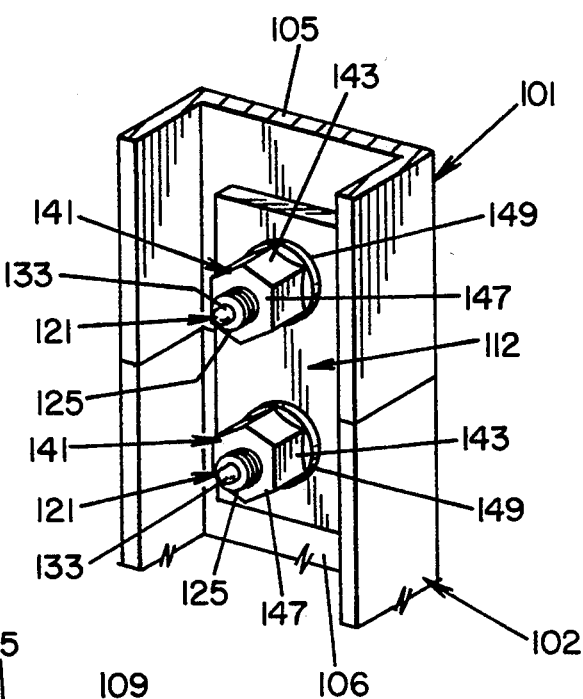
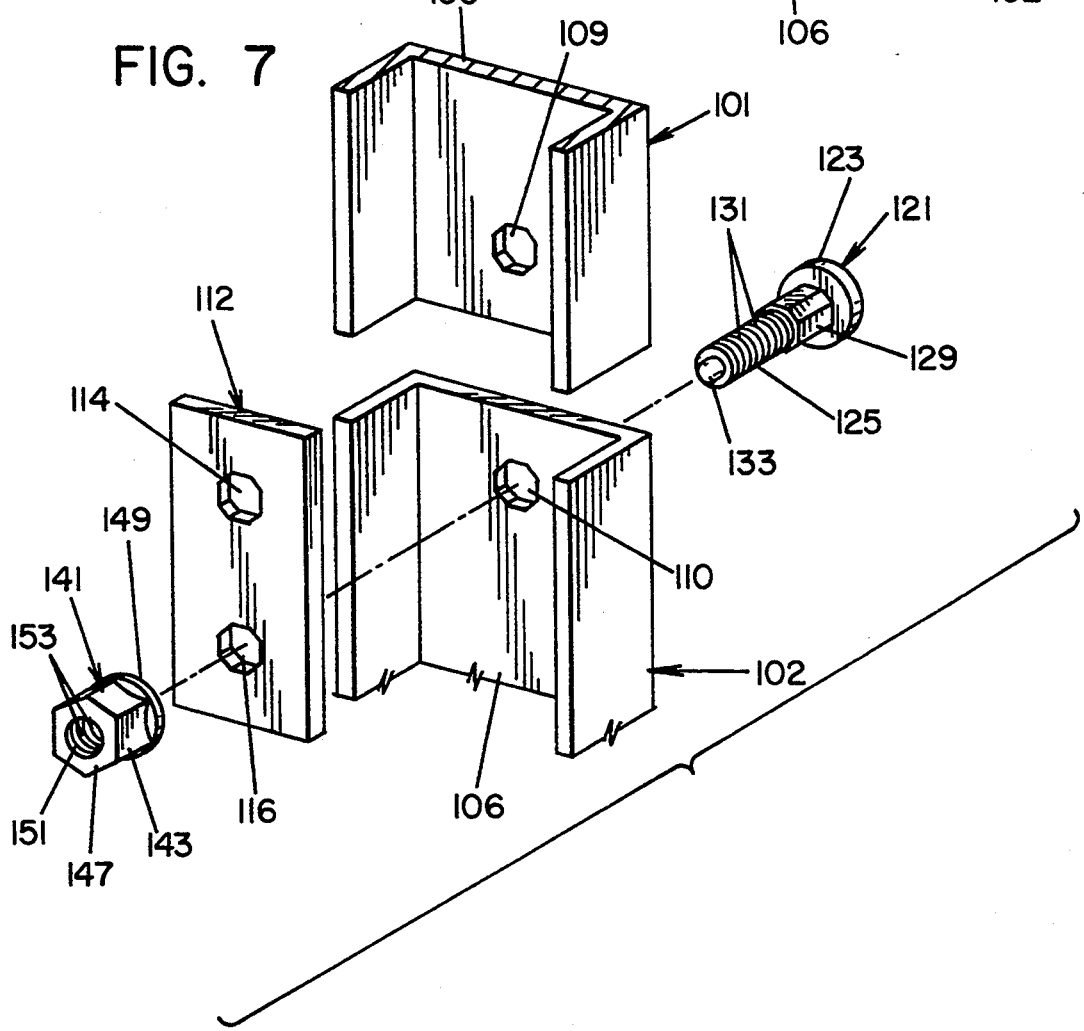

SYSTEM FOR JOINING SUPPORT MEMBERS

BRIEF SUMMARY OF THE INVENTION

This invention relates to static structures comprising support members useful as temporary or permanent scaffolding or racks for shelving, construction, bracing and other similar purposes. More particularly, the invention relates to a system for assembling a static structure in a manner so as to insure strength and rigidity even after the component parts have been assembled and disassembled a large number of times. The invention also relates to a unique fastener system for use in securing the component members of the structure together.

Prior art static structures such as scaffolding are typically assembled from various component parts including elongated support members such as channels or angle irons, secured to one another with suitable cross bracing and nuts and bolts. Frequent use, assembly and disassembly of the support members causes the bolt holes or slots to become enlarged, the bolts to become damaged during assembly and disassembly and the threads on the nuts and bolts to become worn. Often, difficulty is encountered in assembling structures so that the corners are at right angles when assembled and remain true until the structure is disassembled. Often scaffolding and other supports are erected in the field on location. As a result, adequate instructions are often lacking, and the proper tools are not available for assembly and disassembly. Without levels, squares and plumb lines, the corners often are not true, resulting in structures that have a tendency to lean, sway and possibly collapse risking personal injury and property damage. At the same time, because of the presence of bolt holes or slots that become worn and oversize, the rigidity of the structure is determined in large part by the ability and necessity of making the nuts and bolts as tight as possible.

Difficulties are often encountered when attempts are made to weld support members together, again based on the difficulty of maintaining precise positioning of the members during welding. Likewise, disassembly of the welded structure is complicated by the necessity of using a cutting torch or other special equipment to separate the welded members.

The present invention relates to a simple yet effective system for the assembly of static structures such as scaffolding, shelving or the like which can readily be used by a worker at a work site for construction, repair, or painting.

One objective of the present invention is a structure which can be easily assembled and disassembled, and which when assembled, results in the precise alignment of the component parts without the need for special leveling tools or the like.

Another object of the invention is a strong, rugged and safe temporary structure which can be readily disassembled and reassembled without damage to the component parts.

Yet another object of the present invention is the ability to repeatedly assemble component parts with accurate positioning of individual support members to be permanently joined together.

Each structure includes two or more elongated support members having a plurality of identically sized holes, each hole being in the shape of an equilateral polyhedron having four sides or a multiple thereof. The holes are arranged in at least one row in the longitudinal direction of each support member. The support members are joined together by aligning at least one or preferably two holes of the first member with matching holes in a second support member and securing them together using a nut and bolt assembly. The shank of each bolt includes a non-threaded neck portion adjacent the head of the bolt and a threaded portion adapted to engage the threads of the nut. The non-threaded portion has a cross-section which fits with to the polyhedral shape of the holes and a length that is at least equal to the combined depth of the holes of the support members assembled together. The threads of the nut do not extend entirely through the nut but instead terminate short of one end where they are joined with an outwardly flaring frusto-conical portion of the nut. The nut engages the bolt so that the frusto-conical portion faces the head of the bolt and serves the purpose of protecting the threads of the bolt and the nut from damage in the event that the unthreaded portion of the shank is slightly longer than the thickness of the support members through which the bolt passes.

The invention is particularly applicable to the assembly of two or more structural member such as channels or angle members at precise predetermined angles to one another, and to the design of the fasteners used for the assembly as well as the pattern and shape of holes in the structural member adapted to receive the fasteners. The use of octagonal holes and eight pointed star-shaped holes, and bolts in which the non-threaded portion of the shank has the same cross-section as the hole, permits the structural members to be arranged at angles of 45° and 90° with respect to one another.

BRIEF DESCRIPTION OF THE DRAWINGS

FIG. 6 is a fragmentary assembled perspective view of two channels in longitudinal alignment with one another;

FIG. 7 shows the channel elements of FIG. 6 in a disassembled perspective view;

DETAILED DESCRIPTION OF THE INVENTION

The drawbacks of prior art static structures are overcome by the support system as described and claimed in the present invention. This support system embodies the advantages of quick assembly, ready disassembly, accurate alignment of parts, and adequate strength even after repeated assembling, rugged use during assembly, rapid disassembly, and general physical abuse through rough handling.

As previously stated, the invention covers a structural system including at least two support members containing cooperating bolt holes having a cross-section which is square, octagonal, or a further multiple of four sides, fasteners comprising bolts having an unthreaded portion of the shank adapted to fit into the holes, and nuts adapted to secure the bolts in place thereby positioning the support members in fixed relationship with respect to one another.

Figure 1:
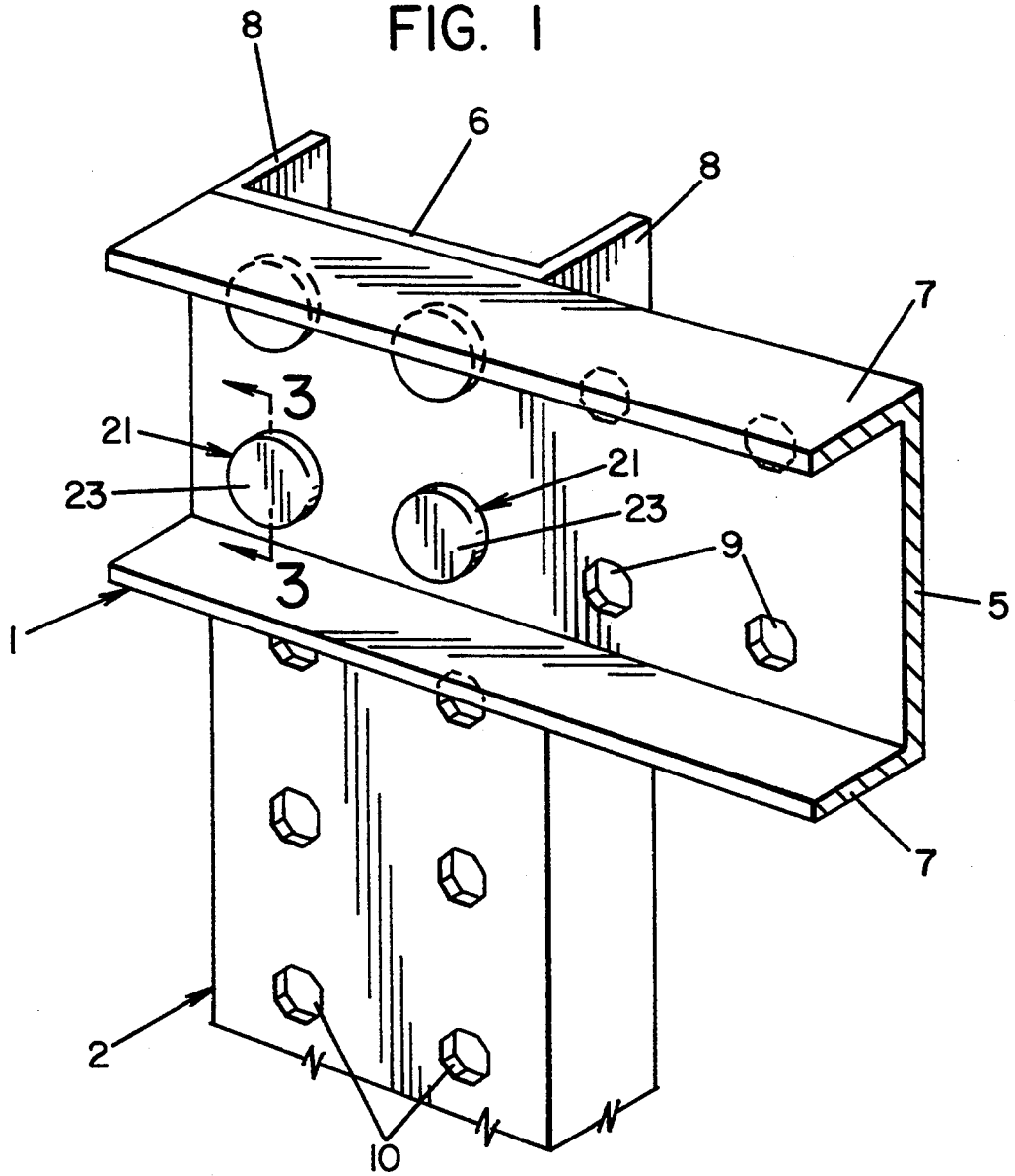
FIG. 1 is a fragmentary perspective view of two channels shown at right angles to one another and joined together in accordance with the teaching of the present invention.
Figure 2:
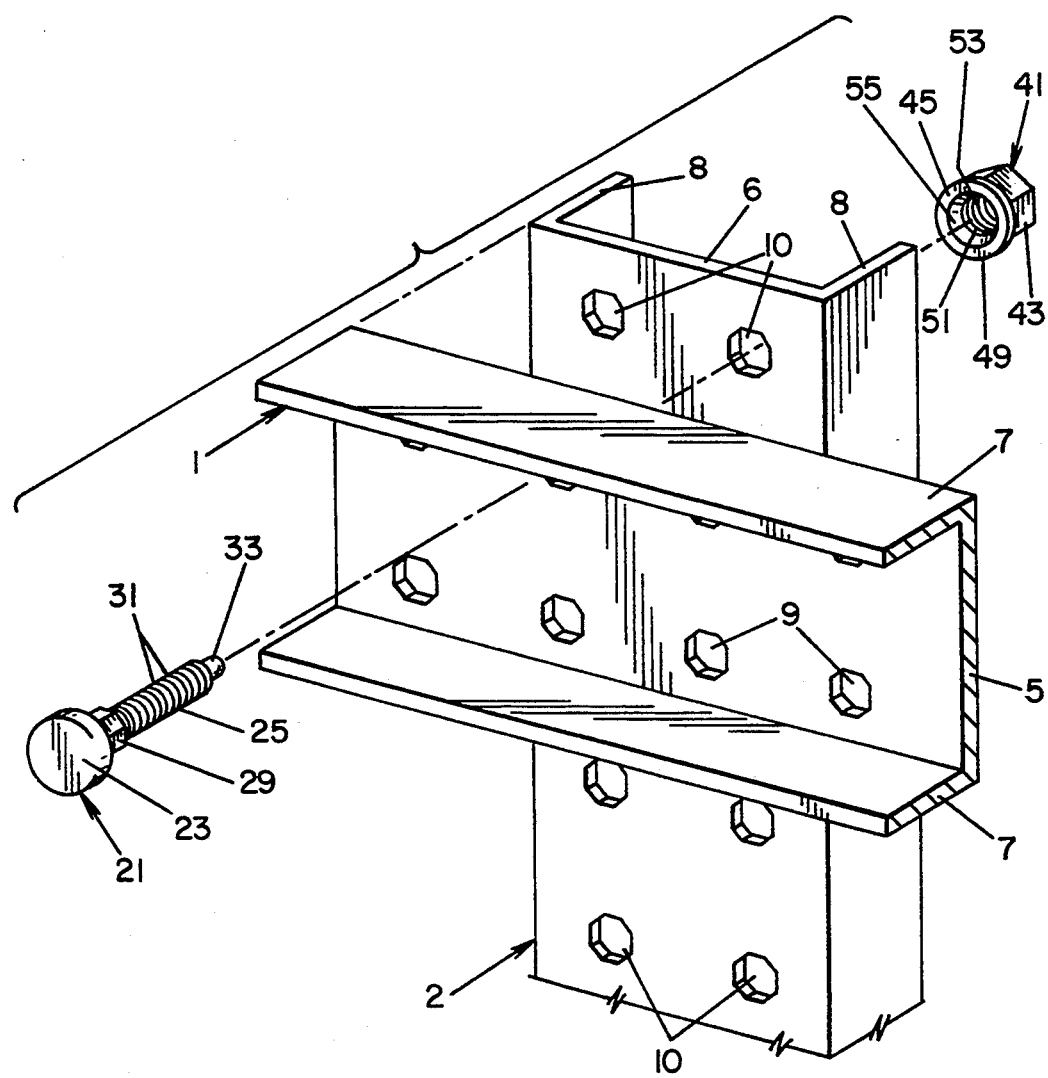
FIG. 2 is a disassembled perspective view of the channels of FIG. 1.

Referring now to the drawings, FIGS. 1 and 2 show in perspective a pair of structural support members respectively in assembled and disassembled relationships. The support members 1, 2 each comprise a channel of conventional design consisting of a web 5, 6 and a pair of parallel flanges 7, 8 joined at right angles to either side of the web to form the familiar channel shape. Each of the channels is shown with two rows of holes 9, 10 having the polyhedral shape of an octagon. A bolt 21 passes through each of the holes and is secured in place with nut 41.

Figure 3:
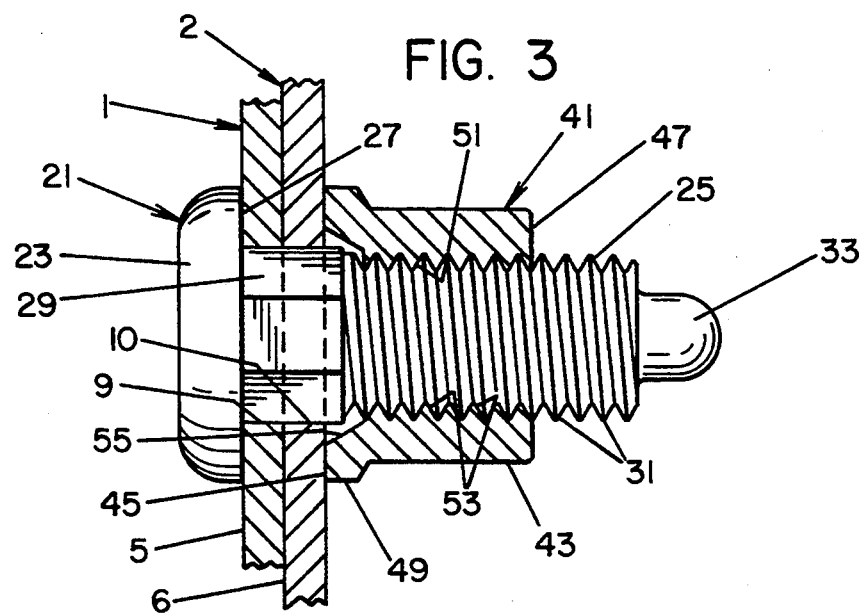
FIG. 3 is an enlarged cross-sectional view of two support members joined together with a nut and bolt assembly of the present invention, said view taken along line 3—3 of FIG. 1.
Figure 4:
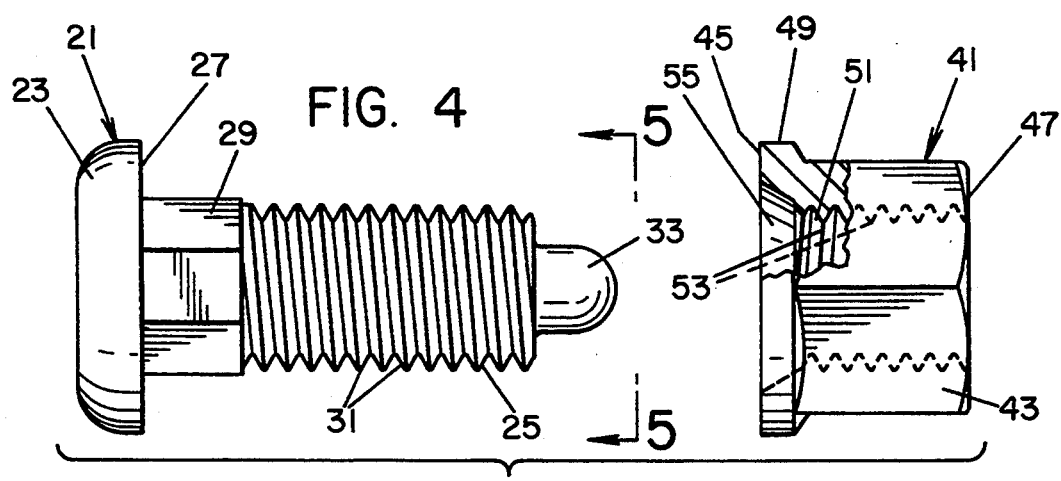
FIG. 4 is an expanded view of a nut and bolt, partially in cross-section, useful as the fastener of the present invention.
Figure 5:
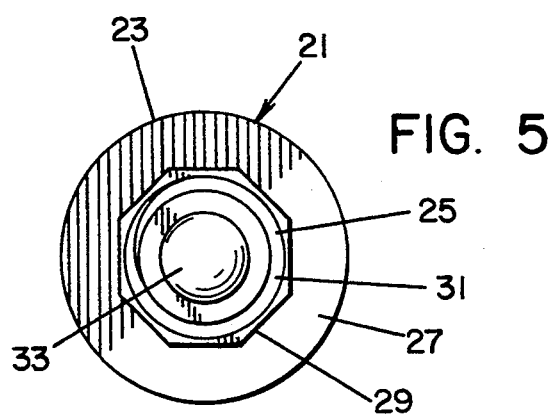
FIG. 5 is a view taken along line 5—5 of FIG. 4.

The unique design of the nut and bolt facilitate assembly of the individual support members while ensuring proper alignment of the channels or other support members with respect to one another. Details of one embodiment of these fasteners are shown in FIGS. 3, 4 and 5. Bolt 21 comprising a head 23 joined to a shank 25 to form shoulder 27. The shank includes an unthreaded neck 29, a threaded portion 31 adapted to receive the nut and an extension 33. The neck 29 is shaped to engage the holes and is designed to closely mate therewith with close tolerance but not necessarily a press fit.

The nut 41 includes an outer surface 43 of conventional design, such as a hexagonal cross-section, adapted to be gripped by a suitable tool, such as an open end wrench, box wrench or socket wrench. The nut includes a pair of parallel faces 45, 47 at least one having a planar surface and a radially extending flange 49. The hole 51 through the nut 41 includes a threaded portion 53 and an unthreaded portion comprising a frusto-conical surface 55 having an inner diameter at least as large as the root diameter of the thread on the nut.

The details of the structural assembly are shown in FIG. 3 wherein two webs 5, 6 of two respective channels are abutted and secured together with a bolt and nut. The neck 29 of the bolt has a length sufficient to extend through the holes in webs 5, 6 and has a shape adapted to fit the cross-sectional shape of the holes. The neck receives the weight of the two channels and therefore should provide maximum bearing surface in the holes. For this reason, the length of the neck is no less than, and is preferably up to ten percent greater than the combined thickness of the webs, thereby extending slightly beyond the web 6 of channel 2. The unthreaded frusto-conical portion 55 of the nut permits the nut to be tightened securely against the web 5 without damage to the threads of the nut or the bolt even though the unthreaded neck portion of the bolt shank extends a short distance into the hole of the nut.

During disassembly, the nut is loosened and removed after which the bolt is readily removed by sharply striking the extension 33 with a hammer or mallet to disengage the neck 29 from the holes in the channel members. This feature permits closer tolerances between the cross-section of the neck and the dimensions of the holes and eliminates the necessity for jiggling the support members to loosen the bolt. The threaded end of the bolt is protected from impact by the tap-out portion 33 which takes the full impact of the hammer blows.

Referring again to FIGS. 1 and 2, each channel has two rows of octagonal holes 9, 10 extending in a longitudinal direction. The two rows are spaced apart from one another so that each set of four holes is located at the corners of a square, the distance between holes in each row being equal to the distance between the two rows. The number of rows as well as their spacing and the size of the holes are dependent upon various load bearing factors and can readily be determined empirically by calculation. Typically, for joining together channels having a depth, or distance between webs less than about 3", a single row of octagonal holes spaced on centers that are between about 1" and about 2" apart and utilizing a ½" bolt is adequate. For channels having a depth between 3" and 6", two rows of holes are preferably used. If the webs of the channels are less than 5" in depth, the holes are spaced between about ¾" and about 3", preferably about 1" apart in each row, and the two rows are spaced the same distance apart. For channels having webs with a depth of 5" or more, the two rows are spaced between about 2" and about 4", preferably about 3" apart, and the holes in each row are spaced from one another the same distance.

Figure 8:
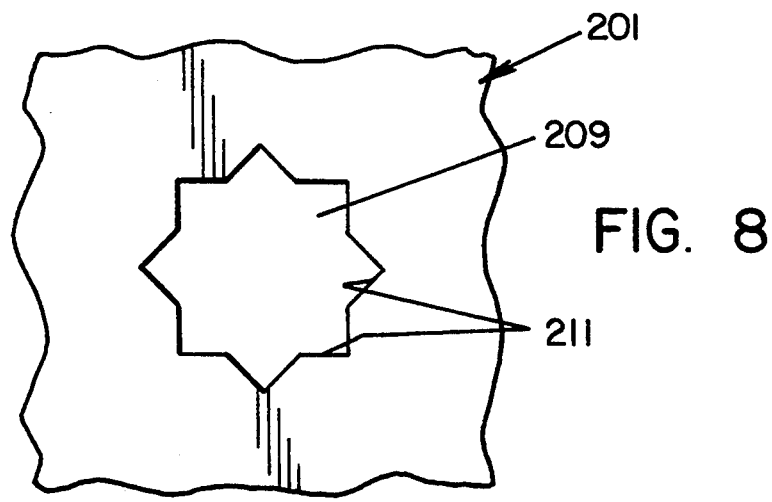
FIG. 8 shows a variation in the shape of the bolt hole in a support member.

It will be evident, when using a series of octagonal holes or the star-shaped holes shown in FIG. 8, in the respective structural members, the support members can readily be assembled at angles of 45° or 90° with respect to one another without the necessity of using special equipment to determine the precise angles.

FIGS. 6 and 7 show a simplified method of joining two channels in the longitudinal direction with a suitable reinforcing plate using the system of the present invention. Two identically shaped and sized channels 101, 102 are coupled together with a reinforcing plate 112 containing at least two polyhedral holes 114, 116 adapted to match the corresponding holes 109, 110 in the webs 105, 106 of the respective channels. The plate is secured in place by two bolts 121 and two nuts 141 threaded onto the bolts. Each of the bolts 121 comprises a head 123 joined to a shank 125 consisting of an unthreaded neck 129 of orthogonal cross-section, a threaded portion 131 and extension 133. As previously described in reference to FIG. 4, the nut 141 has a hexagonal head 143, a flanged face 149, and a second face 147, an annulus 151, partially threaded with threads 153 engaging the threads 125 of bolt 121.

An advantage of this stacked arrangement is that the vertical weight load is carried by the webs and flanges of the individual channels. If, however, through normal wear and tear the adjacent ends of the channels do not match squarely, the longitudinal alignment of the channels is still maintained by the bolts in the octagonal holes with at least some of the load being carried by the necks of the bolts. For added strength, plates can be bolted on both sides of the web, with the neck of the bolt extending through the webs and both plates.

Two channels having different web depths can be joined together in a linear direction without the use of a reinforcing plate. This is achieved by overlapping the ends of the channels and securing them to one another with at least one bolt passing therethrough, and secured in place with a nut. Obviously, the position of the holes in the respective channels must be in longitudinal alignment with one another for assembly.

Figure 9:
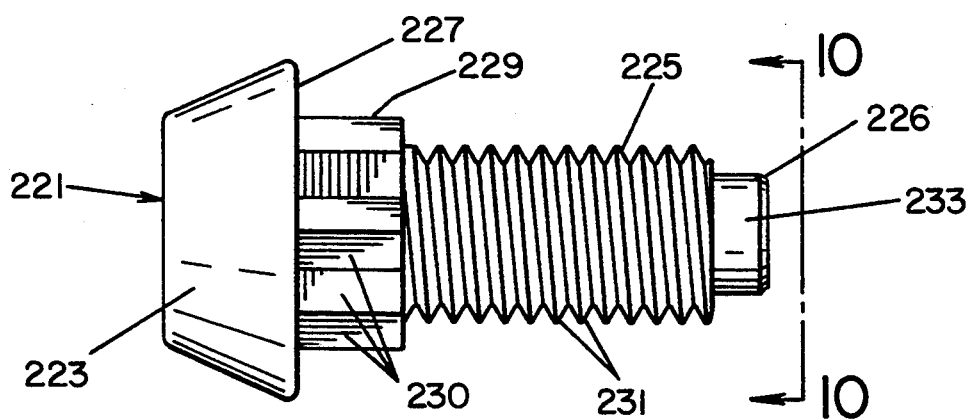
FIG. 9 shows a bolt of the present invention adapted for use with the of FIG. 8.
Figure 10:
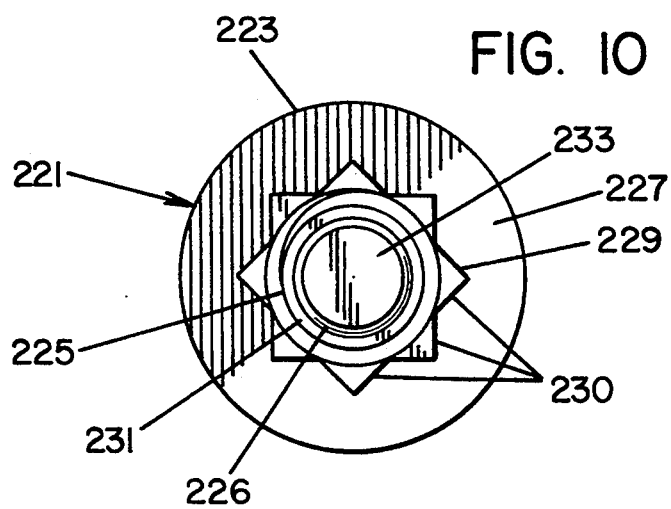
FIG. 10 end view of the bolt of FIG. 9 taken along line 10—10.

FIG. 8 shows, in a preferred embodiment of the invention, a portion of support member 201 having a hole 209 in the form of an 8 pointed star having 16 equal sides 211 and adapted to receive a bolt of the type shown in FIGS. 9 and 10. In one variation, the internal angle at each point of the hole 209 is between about 45° and about 90°. The hole may be made using a suitable die punch. In another variation, the hole has the shape which would be generated by punching out a first hole using a square punch, and then repeating the same process with the punch rotated 45° around its axis from the first punch position.

Referring to FIGS. 9 and 10, the bolt 221 comprises a frusto-conical head 223, a shank 225 including an unthreaded neck 229 and a threaded portion 231. A shoulder 227 is formed where the shank joins the bolt head. A cylindrical extension 233 projects beyond the end of the bolt threads. The diameter of the extension 233 is smaller than the root diameter of the threads. The extension has a beveled edge 226 as is customarily employed to reduce the likelihood of the edge chipping when struck with a hammer.

The unthreaded neck portion 229 of the shank is star-shaped with 16 equal sides 230 sized to enable the neck portion to engage the holes in the support member. Each apex or point of the star is formed by two sides mating at an angle of 45° to 90° with respect to one another corresponding to the shape of the hole in the support member. The star design provides extensive surface contact area between the bolt and the hole, thereby providing a substantial ability to prevent slipping and misalignment of the structural members.

Figure 11:
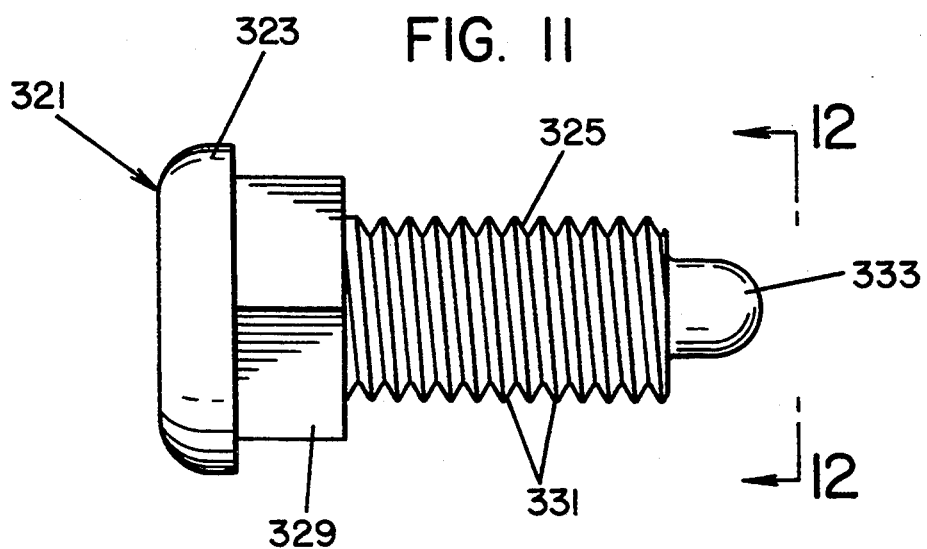
FIG. 11 shows a bolt of the present invention with a square shank adapted to be used in a hole of FIG. 8 or in a square hole.
Figure 12:
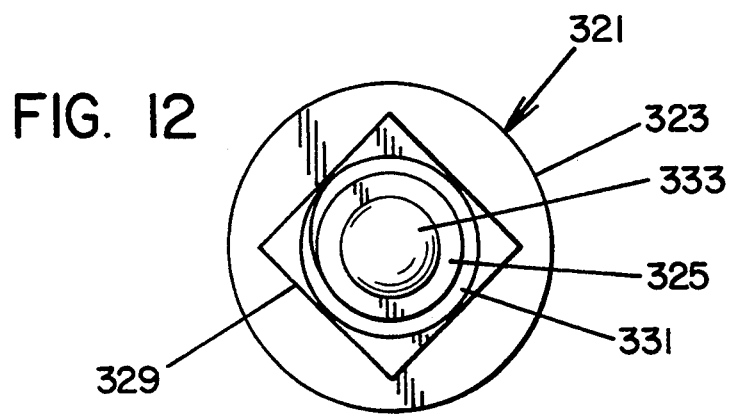
FIG. 12 is a view taken along line 12—12 of FIG. 11.

Referring to FIGS. 11 and 12, an alternative design of bolt 321 comprises a semi-circular bolt head 323 joined to a shank 325 composed of a square neck 329 and threads 331. A dome-shaped extension 333 extends beyond the end of the threads 331. With this extension the bolt can readily be removed from the structural members as previously described, without damage to the threads 331. With star shaped holes shown in FIG. 8 having 90° angles, the square shank on the bolt permits the individual support members to be readily positioned at angles of 45° and 90° with respect to one another.

Figure 13:
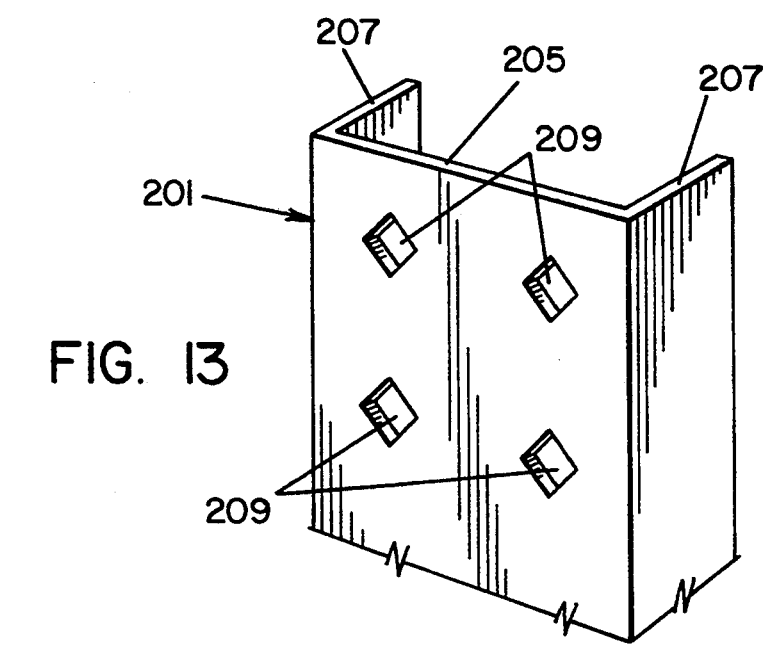
FIG. 13 is a perspective view showing another variation in the shape of the bolt hole in the support member for use with the bolt of FIG. 11.

Bolt 321 is also adapted to be used with corresponding holes in the support members such as channel 201 shown in FIG. 13 having a square cross-section whereupon the structural members can be readily assembled perpendicular to one another without the need to measure the precise angle during assembly. This channel 201 comprises a pair of flanges 207 and a web 205 containing holes 209. As shown, the bolt holes are aligned so that two diagonal corners of each hole are aligned in the axial direction of the channel 201 and the other diagonal corners are orthogonal thereto. In this manner, the load of the vertical support is distributed across the diagonal width of the bolt neck which is about 40% wider than each side of the neck.

The standard web thickness of the 3" steel channel is 0.130". It has been found that a ½" diameter bolt with a ⅞" round head and a square, octagonal or star-shaped neck 0.350" long, when used with a compatible nut with a ¾" hexagonal outer diameter, a 0.875" diameter flanged end, a 0.100" frusto-conical section extending in from the flanged end to join the threads, and a thickness between faces of ⅜" has been found to be satisfactory. A portion of the bolt extends beyond the threads to form a ¼"×¼" dome-shaped tap-out portion.

Depending on the intended load bearing characteristics of the channels, their web thicknesses and weights can vary quite substantially. For instance, with a structural steel channel having a 3" web, the weight typically is between about 3 and 6 pounds per lineal foot and the web thickness ranges from about 0.100" to 0.35". Obviously with deeper webs, the respective weight and thicknesses increase. When determining the minimum length of the neck of the bolt, the total web thicknesses must be determined. Also, as larger and heavier channels are employed, larger diameter nuts and bolts may be required to provide the requisite load bearing capabilities.

Although the invention has been described with particular reference to specific embodiments as shown and described in the drawings and description, it is understood that other variations are likewise contemplated as being within the scope of the invention. For example, certain rigid non-metallic structural members can be assembled using the features of this invention. Furthermore, three or more members can be joined together with the use of bolts having a correspondingly longer neck portion to accommodate the combined thicknesses through which the bolt passes.

Having thus described the invention it is claimed:

1. An assembly comprising a plurality of elongated rigid support members joined together to form a static structure such as scaffolding, shelving, bracing or the like, each support member including a plurality of identically sized holes, each hole being an equilateral polyhedron having four sides or a multiple thereof and a depth, said holes arranged in at least one row in the longitudinal direction of each support member in alignment with at least one matching hole in a second support member, and a fastener extending through a pair of such aligned holes in said support members, said fastener comprising an assembled nut and bolt, said bolt comprising a head, and a shank joined to said head forming a shoulder, said shank including a non-threaded neck portion adjacent said head and a threaded portion engaging the threads of said nut, said non-threaded portion having a cross-section conforming to the polyhedral shape of the hole and a length at least equal to the combined said depth of said holes through which said bolt passes.

2. The assembly according to claim 1, wherein each of said elongated support members is composed of a structural metal.

3. The assembly according to claim 2, wherein each hole is in the shape of an 8-pointed star having 16-sides of equal size, each point of said star forming a 90° angle, and the unthreaded portion of the shank of the bolt has a cross-sectional shape that is compatible with and adapted to closely fit into said hole.

4. The assembly according to claim 2, wherein the unthreaded portion of the bolt shank is square in cross-section.

5. The assembly according to claim 2, wherein at least one of said support members is a channel comprising two flanges joined to a web containing said bolt holes.

6. The assembly according to claim 5, wherein the channel member has a depth of less than about 3" and has a single row of holes in the web midway between the flanges thereof, said holes being equally spaced between about 1" and about 2" apart.

7. The assembly according to claim 5, wherein the channel has a depth of at least about 3" and contains at least two rows of axially aligned holes in the web.

8. The assembly according to claim 7, wherein the depth of the web is less than about 5" and wherein the two rows of holes are evenly spaced between about ¾" and about 3" apart and the holes in each row are spaced the same distance apart.

9. The assembly according to claim 7, wherein the depth of the web is at least about 5", the two rows of holes are evenly spaced between about 2" and about 4" apart, and the holes in each row are spaced the same distance apart.

10. The assembly according to claim 2, wherein at least one of the support members is an angle member.

11. The assembly according to claim 2, wherein the bolt contains an extension projecting axially beyond the threads thereof, said extension having a diameter smaller than the root diameter of the threads and being adapted to receive an impact blow without damage to the threads to disengage the bolt from the hole during disassembly.

12. The assembly according to claim 5, wherein both of said support members are channels joined together in longitudinally extending relationship, and includes at least one elongated rigid brace spanning the abutment of the two channels, each said brace having at least two holes longitudinally spaced to match corresponding holes in the two channels, and bolts passing through said at least two holes with nuts threaded thereon to secure the two channels together.

13. The assembly according to claim 5, wherein the two channels are joined to one another at an angle according to the shape of the holes, and are bolted together with the flanges of one channel extending in the opposite direction to the flanges of the second channel.

14. The assembly according to claim 13, wherein the channels are aligned at an angle of 90° with respect to one another.

15. A fastener consisting of a nut and bolt used for joining elongated metal support members together, said bolt comprising a head and a shank joined to said head to form a shoulder, the shank including a neck portion adjacent the head and having the shape of an equilateral polyhedron having a number of sides equal to four or a multiple thereof, said neck having a length at least equal to the total combined thicknesses of the support members to be joined together, and a threaded portion to receive the nut; said nut having an outer surface adapted to receive a tightening tool, a pair of generally parallel faces, and a hole comprising a threaded portion engaging the threads of the bolts during assembly and disassembly and an unthreaded frusto-conical portion having a minimum diameter no less than the root diameter of the threads and extending axially in from one of said faces a distance at least equal to the amount that the length of the unthreaded neck of the bolt exceeds the combined thicknesses of the support members.

16. The fastener according to claim 15, wherein the bolt contains an extension projecting axially beyond the threads of the threaded portion, adapted to receive impact blows without damage to the threads.

17. The fastener according to claim 16, wherein the extension has a smaller cross-sectional diameter than the root diameter of the threads.

18. The fastener according to claim 17, wherein one of the parallel faces of the nut includes a flange adapted to contact one of said support members as said nut is threaded onto the bolt and wherein the frusto-conical portion of the nut extends axially from said flange toward the threaded portion of the nut.

19. The fastener of claim 15, wherein the neck portion of the shank comprises 16-equal sides forming an 8-pointed star with each side forming an angle of 90° with one adjacent side and an angle of 135° with the other adjacent side.

20. The fastener of claim 19, wherein the head of the bolt has a frusto-conical shape.

21. A method of assembling together a plurality of elongated support members to form a structure such as scaffolding, shelving or the like, each support member containing a plurality of matching, equilateral polyhedral-shaped holes adapted to coincide with corresponding holes in each of the other support members, each hole having a number of sides equal to four or a multiple thereof, said method comprising joining the support members together with one or more nuts and bolts to form a predetermined angle with respect to one another, said angle defined by the number of sides of the holes, each bolt including a head and a shank, the shank comprising an unthreaded neck portion adjacent the head and having a cross-sectional shape and size compatible with said holes in said support members, and a length corresponding to the combined depth of the holes through which the bolt passes.

22. The method according to claim 21, wherein the elongated support members are two metal channels each composed of two parallel flanges joined together by a web and containing at least one row of polyhedral holes spaced longitudinally along the length of the web.

23. The method according to claim 22, wherein the two metal channels have the same cross-sectional size and are joined together in a linear direction by abutting ends of the channels, securing at least one elongated brace to the webs of each channel spanning the abutment, each said brace having at least two holes longitudinally spaced to match the corresponding holes in the two channels and having the same shape as the holes in said channels, and bolting each said brace to said channels.

24. The method according to claim 23, wherein at least one brace is secured to the web of each channel between the flanges.

25. The method according to claim 22, wherein the two metal channels are joined at an angle to one another by bolting the web of the channels together with the flanges of one channel extending in the opposite direction to the flanges of the other channel, the angle determined by the alignment of the polyhedral holes in the respective channels.

26. The method according to claim 22, wherein the two metal channels have different cross-sectional sizes whereby the channels are joined together in a linear direction by overlapping the ends of the channels and securing the channels to one another by the use of at least one bolt passing through aligned holes in the respective channels and secured thereto by a nut threaded onto the bolt.

27. The method of claim 21, wherein each of the polyhedral-shaped holes is in the shape of an 8-pointed star.

28. The method of claim 27, wherein the unthreaded neck portion of each bolt has the same cross-sectional shape as the holes.

29. The support member of claim 22, wherein the holes in the web are square, and are positioned with two diagonal corners aligned in the axial direction of the channel and the other two corners are orthogonal thereto.

* * * * *